Oct. 28, 1958 W. J. KIENE 2,857,759
INJECTOR TESTING DEVICE
Filed Feb. 23, 1955 3 Sheets-Sheet 1
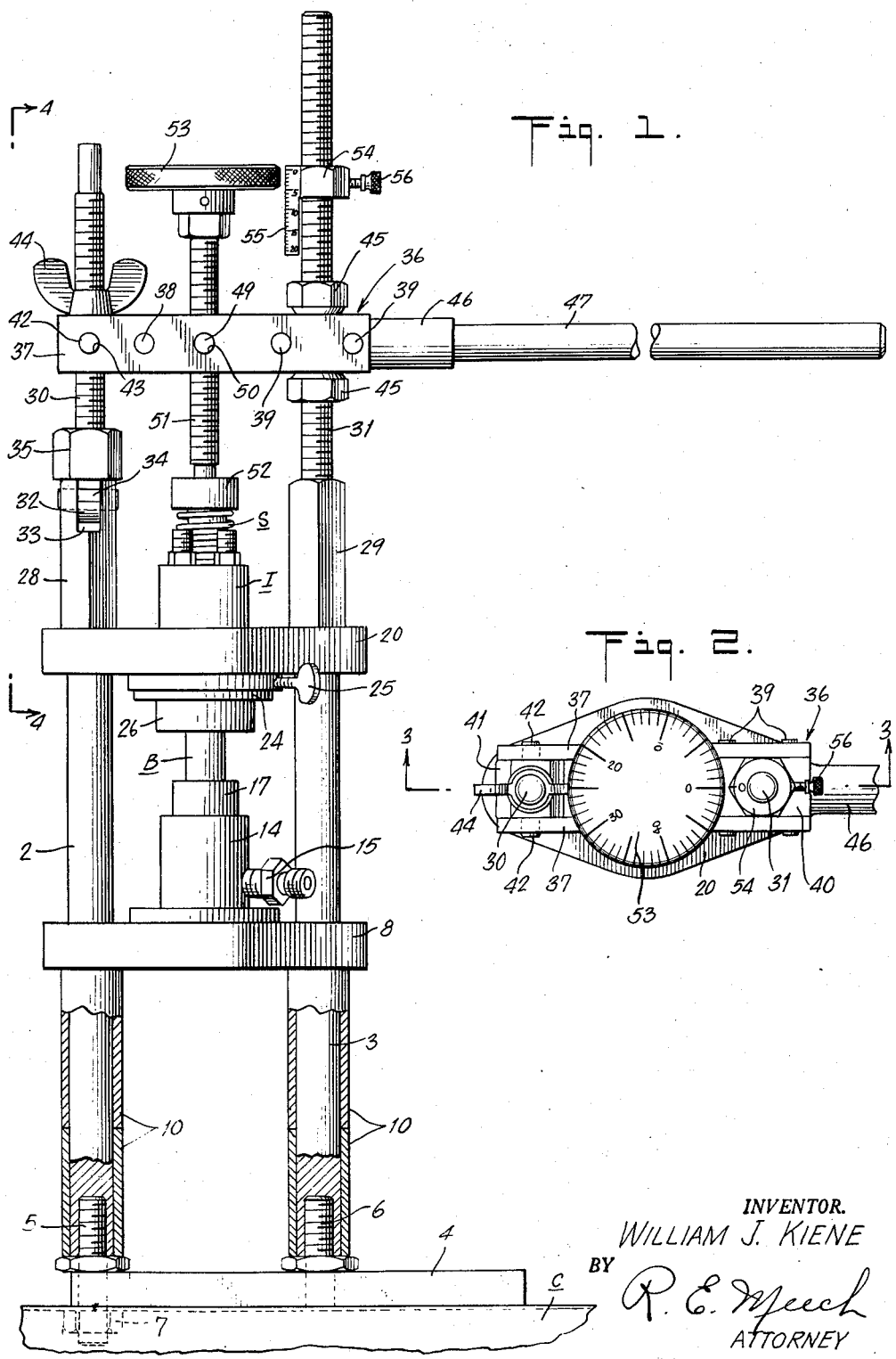
INVENTOR.
WILLIAM J. KIENE
BY
R. E. Meech
ATTORNEY

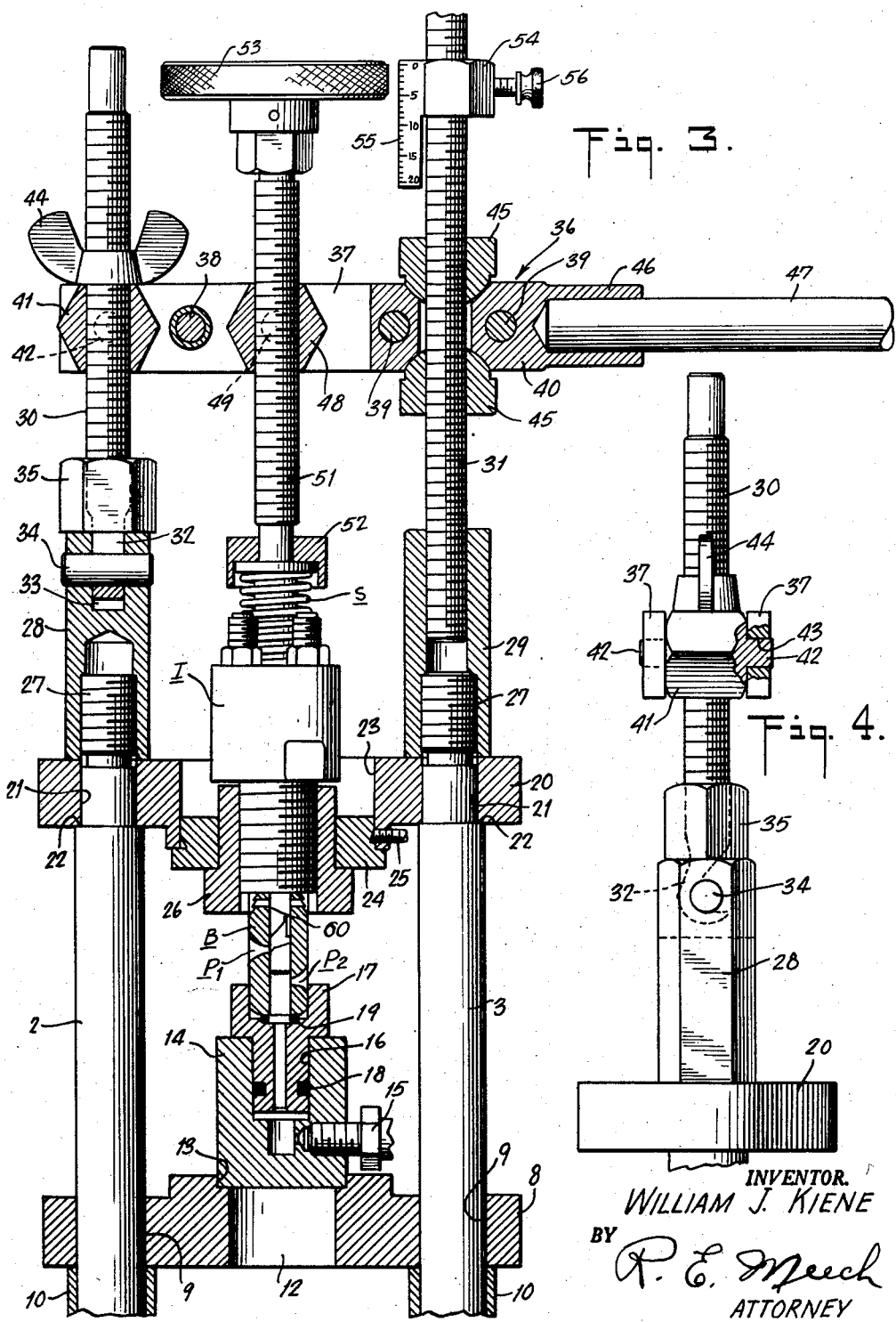

United States Patent Office 2,857,759
Patented Oct. 28, 1958

2,857,759

INJECTOR TESTING DEVICE

William J. Kiene, Park Ridge, Ill., assignor to Dorothy S. Kiene, Park Ridge, Ill.

Application February 23, 1955, Serial No. 489,886

6 Claims. (Cl. 73—119)

This invention relates to a device for testing and checking unit injectors and nozzles of the type commonly used in diesel engines.

It is the customary practice to test injectors and the nozzles thereof for fuel injection in diesel engines. Such injectors should be thoroughly checked and tested prior to their assembly in the engine, otherwise considerable time and labor is wasted should it develop that the injector or nozzle is defective after assembly. Also, it is advisable to test the injectors and nozzles from time to time in order to determine whether or not they are functioning effectively and efficiently. Various tests of injectors and nozzles have to be made, such as tests for the proper seating and performance of the plunger and bushing, spray pattern tests and a test for leakage at the tip, check valve and screw cap leakage tests, and popping tests.

Heretofore, various types of nozzle and injector testing equipment have been suggested and used. While some of these devices were satisfactory for certain tests, they were not designed to perform all of the desired tests as mentioned above. Some of them performed only one or two tests and additional testing equipment was required to perform the other desired tests. Also, some of the devices were cumbersome and of a heavy construction thereby making for inconvenience if it was desired to transport them for use from one location to another. Some of these devices were difficult to use and operate and oftentimes were most inefficient in their use. It is to a device for eliminating the above mentioned disadvantages and to a device which will perform each and all of the required tests by means of a single unit that the present invention relates.

Accordingly, it is the general object of the present invention to provide an improved unit injector testing device which will perform all the required tests to which a unit injector is adapted to be subjected.

It is another important object of this invention to provide a new and novel unit injector testing device which is simple and inexpensive in its construction whereby the device can be easily and conveniently transported from one point to another thereby making the device portable.

It is a further object of the invention to provide an improved unit injector testing device which consists of a number of parts which can be easily fabricated and assembled so as to provide a strong and rugged device.

It is still another object of the present invention to provide an improved unit injector testing device which is simple in its operation and use and, at the same time, efficient and effective.

It is another important object of the invention to provide a unit injector testing device wherein it is possible to test injectors for any given specifications to the same standard regardless of the injector design or particular manufacturer.

Various other objects and advantages of this invention will be more apparent in the course of the following specification and will be particularly pointed out in the appended claims.

In the accompanying drawings, there is shown for the purpose of illustration, an embodiment which my invention may assume in practice.

In these drawings:

Fig. 1 is a front elevational view, partly in section, of the improved testing device of my invention, showing it assembled for conducting one series of tests of an injector;

Fig. 2 is a top plan view of the same;

Fig. 3 is a sectional view taken on line 3—3 of Fig. 2;

Fig. 4 is a side elevational view of the upper portion of the device, taken from the left side as shown in Fig. 1.

Figure 5:
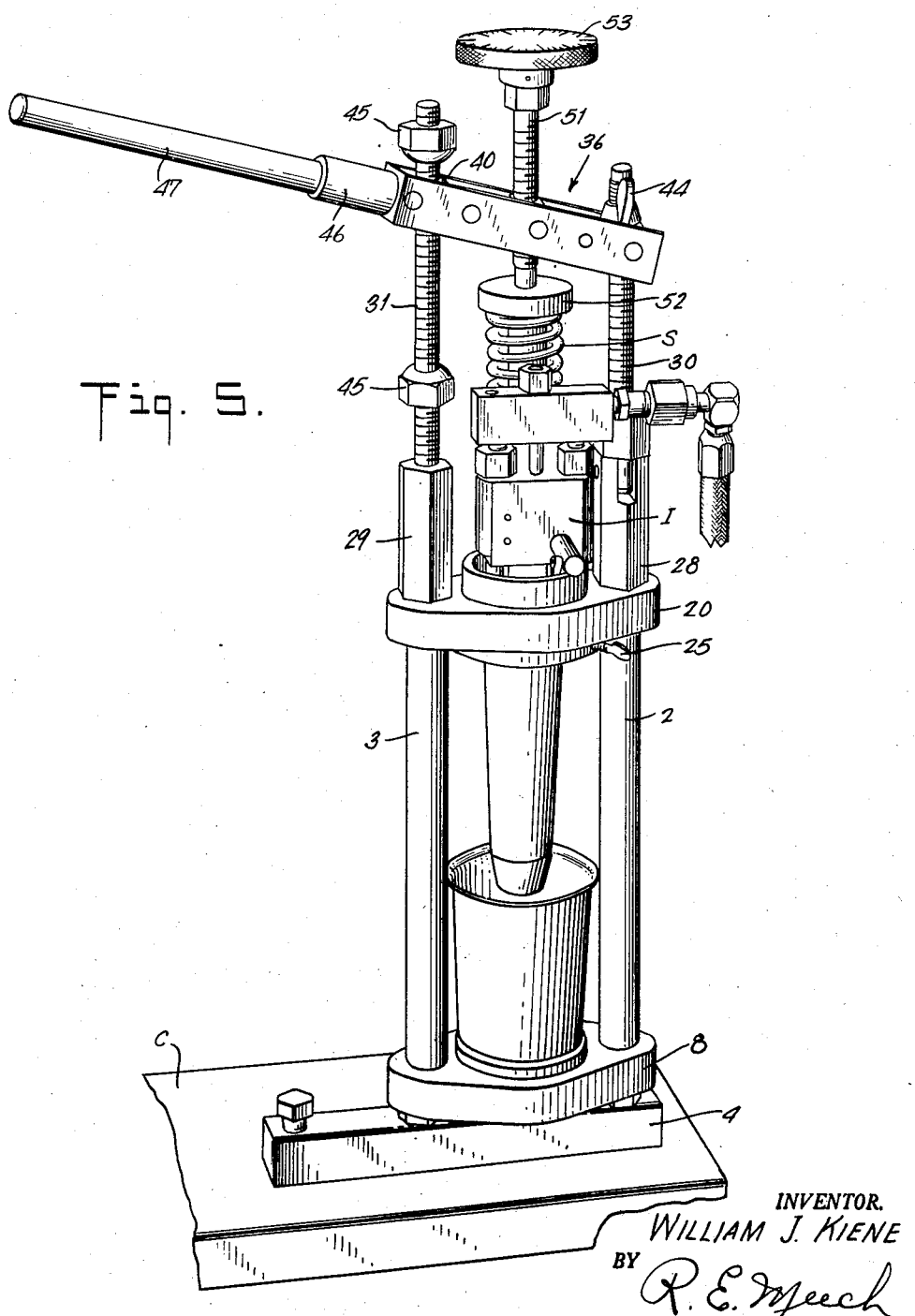
Fig. 5 is a perspective view of my improved device showing it assembled for conducting other tests on an injector.

Referring more particularly to the drawings, the improved testing device of the present invention consists of a pair of spaced-apart vertical and parallel columns or post-like members 2 and 3 having the lower ends thereof attached to a base 4 which is preferably mounted on the inside of a cover C to a box in which the device in its dismantled form is encased when not in use. The lower ends of the post-like members 2 and 3 are secured to the base 3, preferably by means of threaded stud and cap members 5 and 6, respectively, which fit into holes in the base. The outer end of the stud 5 is threaded so that a nut 7 can be threaded thereon so as to hold the post-like member 2 securely in position in the base.

There is provided an adjustable yoke-like platform member 8 having a hole 9 in each end thereof through which the post-like members 2 and 3 extend. Below this platform member 8 there is arranged around the post-like members 2 and 3, spacer sleeves 10 which support the platform member 8 on the post-like members 2 and 3. It will be understood that the height of this platform 8 is adjusted by providing spacer sleeves of various lengths which fit loosely around the post-like members. Centrally of the platform member 8, there is arranged a circular opening 12, and there is arranged on the upper side thereof a concentric shoulder 13 in which there is seated, in the present instance, a cap holder 14 having a threaded connection 15 carried thereby to which a test pump (not shown) is adapted to be attached for various test uses of the device.

There is seated in a cylindrical opening 16 in the cap holder 14, a cap 17 for the injector bushing B of the injector I positioned thereabove. Between the outer wall of the cap 17 and the inner wall of the cap holder 14, there is provided preferably an O sealing ring 18 so as to provide an oil tight seal between the cap and the cap holder. There is also provided preferably another O sealing ring 19 which is positioned between the end of the bushing B and cap 17 so as to provide an oil tight seal at this point.

Above the platform member 8, there is arranged another similar yoke-shaped platform member 20 having a hole 21 arranged in each end thereof through which the respective post-like members 2 and 3 extend. There is arranged on each of the post-like members 2 and 3, a circumferential shoulder 22 for supporting this platform 20. Centrally of this platform 20, there is arranged therein a circular hole 23 through which the injector is adapted to extend. In the lower side of this hole 23, there is arranged a bushing 24 and a thumb screw 25 for holding the bushing therein. Within this bushing 24 there is arranged a nut-like member 26 for holding the injector. It will be understood that the platform 20 serves to guide and support the injector in accordance with the test being made. Also it will be seen in certain tests, the two platforms 8 and 20 together with the post-like members 2 and 3 to which they are attached, act as a clamping means to hold the parts of the injector together and holds the liquid seal on the backing.

Above the platform 20, the upper ends of each of the post-like members 2 and 3 are threaded, as at 27, and there is provided a pair of elongated nut-like members 28 and 29 for holding the platform 20 in position on the shoulders 22 at the upper ends of the post-like members 2 and 3. There is provided a pair of stud-like threaded extensions 30 and 31 which are attached to the upper ends of the nut-like members 28 and 29, respectively. The extension 31 is screwed into the opposite end of the elongated nut 29 from that of the post-like member 3. On one end of the extension 30, there is arranged a hook-like portion 32 which fits into a slot 33 arranged in the upper end of the elongated nut 28 and co-operates with a pin 34 extending transversely through the nut so as to be held in position therein. There is also arranged on the extension 30, a lock nut 35 which co-operates with the upper end of the nut 28 to lock the hook-shaped portion 32 in position therein.

There is provided a beam-like member 36 which extends between the extensions 30 and 31 and is removably attached thereto so as to be adjusted for the particular test adapted to be made. This beam-like member, as more clearly shown in Fig. 2 of the drawings, consists preferably of a pair of spaced apart parallel plates 37 securely attached together by means of a spacer rivet 38 and a pair of rivets 39 which extend through a socket-like member 40 arranged adjacent one end thereof. On the opposite end of the beam-like member 36, there is arranged a nut-like member 41 which is positioned between the plates 37. There is carried by this nut-like member 41, oppositely extending trunnion-like portions 42 which extend into holes 43 in the plates 37 so as to provide a pivotal connection therewith when the beam-like member 36 is adapted to be used as a lever in a manner to be described, and as shown in Fig. 5 of the drawings. The nut-like member 41 is screwed onto the threaded extension 30 and there is positioned thereabove, preferably a wing nut 44 for locking and regulating the height of this end of the beam-like member 36.

There is arranged on the other threaded extension 31, a pair of nuts 45 with one positioned above and the other positioned below the socket-like member 40 which nuts co-operate therewith to adjust the height of this end of the beam-like member 36. There is carried by the socket-like member 40, preferably a hollow extension 46 into which a handle member 47 is adapted to be inserted in one testing operation of the device.

Centrally of the beam-like member 36, there is arranged between the plates 37, another nut-like member 48 similar to the nut-like member 41 likewise having oppositely extending trunnion portions 49 carried thereby which extend into holes 50 in the opposed plates 37 for pivotally connecting this nut-like member thereto. There is provided a screw 51 which is carried by and screwed into this nut-like member 48. There is arranged on the lower end of this screw 51, preferably a centering cap member 52 therefor. On the upper end of the screw 51, there is arranged a hand wheel 53 for manipulating the screw which preferably has a flat top surface on which there is arranged circumferentially therearound, preferably calibrations or graduations to indicate each thousandths of an inch travel of the screw. Directly opposite the hand wheel 53, there is arranged on the threaded extension 31, a reference nut 54 having an extension arm 55 carried thereby which carries calibrations or graduations of fifty thousandths of an inch. The calibrations on the hand wheel 53 co-operate with the calibrations on this extension arm 55 to indicate the distance traveled by the screw 51 when it is turned. It will be seen that each mark indicates one revolution of the screw. This reference nut 54 is locked in place on the extension 31 by means of a thumb screw 56.

Having described the construction of the improved testing device of my invention, it is used for conducting various tests as follows. It will be understood that the lower platform member 8 is first set at the proper height for the particular test desired to be made. This is done by removing the post-like members 2 and 3 and positioning spacer sleeves 10 of the proper lengths thereon and then replacing the post-like members in the base.

When the device is adapted to be used for testing the plunger, the check valve, the tip seal or any test requiring oil pressure forced back through the injector, the device is set up as shown in Figures 1 and 3 of the drawings. In such tests the beam-like member 36 functions as a so-called strong-back. In order to position the injector to be tested in the device, it is necessary to first swing this beam-like member 36 to one side. This is accomplished by loosening the nuts 45 on the extension 31 to either side of the socket-like member 40 of the beam-like member 36. The lock nut 35 on the extension 30 is then loosened and the hook-shaped portion 32 disengaged from the pin 34 and from the end of the post-like member 2 so as to permit the beam-like member 36 to be swung to one side. The proper size fitting or bushing 24 is then positioned in the upper platform 20. The injector I is then positioned in the device so as to extend through the platform 20 with the tip or bushing B thereof seated in the cap 17 carried by the lower platform 8. The beam-like member 36 is then swung back into place over the injector and the hook-shaped portion 32 engaged with the pin 34 in the elongated nut 28. The lock nut 35 is then tightened so as to lock securely the extension 30 to the upper end of the post-like member 2. The height of the beam-like member 36 is then adjusted and leveled by means of the wing nut 44 and the lock nuts 45. The centering cap 52 is then positioned on the upper end of the injector and the lower end of the screw 51 seated therein. The screw 51 is then turned so as to hold the injector in place in the device for conducting the test. After the proper adjustment of the various fittings have been made including that of the nut-like member 26, the injector is in readiness to be tested. In testing the plunger, check valve and screw cap for leakage, best results are obtained by removing the plunger spring S in certain types of injectors. Pressure is then applied to the cap holder 14 through the connection 15 by means of a conventional test pump (not shown) and any leakage can be readily determined.

In conducting tests for plunger and cap seating and for the spray pattern of the injector, the test pump is also used and connected to the fuel inlet connection of the injector and the bottom platform 8 is adjusted to a lower position so as to support a cap or suitable container as shown in Fig. 5.

When it is desired to use the device of the present invention for popping tests, the beam-like member 36 is used as a lever, as shown in Fig. 5 of the drawings. When used as a lever for such tests, the lock nuts 45 of the extension 31 on the upper and lower sides of the socket-like member 40 of the beam-like member 36 are respectively raised and lowered so that the socket-like member is permitted to move freely along the extension 31. The handle 47 is then positioned in the hollow extension of the socket-like member 36. The screw 51 and the wing nut 44 are then adjusted so that the beam-like member 36 together with the handle 47 carried thereby is substantially level in the middle of the stroke. Thus, it will be seen that the beam-like member 36 can now be used as a pump.

The device of the present invention is so constructed and arranged that it can perform a test, namely, a plunger and bushing test, not possible with other injector testing devices heretofore known or used. To perform this, as shown in Figs. 1 and 3 of the drawings, test the outer shell and tip are removed from the injector, exposing the bushing. The screw 51 of the device is positioned in the center hole of the cap 52 and the beam-like member 36 secured to the extensions 30 and 31 as previously described so as to provide a strong back. The reference nut 54 is then positioned on the extension 31 so that the graduations on the arm 55 thereof are in such position as to cover the length of travel adapted to be used in the test. The test pump (not shown) is then connected to the connection 15 of the holder 14. The test pump is operated slowly as the screw 51 is turned inwardly. As the pressure is built up on the plunger 60, the screw 51 is turned slowly outwardly or backed away until a mist occurs at the ports P1 and P2 and the position of the hand wheel 53 is noted from the calibrations. The screw 51 is again turned inwardly as the pressure is maintained on the injector and when a slight oil mist is observed at the ports the position of the hand wheel 53 is again noted. The length of the injector stroke is then computed which is the difference between the above mentioned readings. As has been hereinbefore stated, the hand wheel 53 is graduated for every thousandths of an inch and the reference arm 55 has graduations of fifty thousandths of an inch or one turn of the screw. The length of the stroke of the injector should be within the limits prescribed by the manufacturer of the particular injector being tested.

In this test, a leaky or scored plunger can be readily detected by seepage at the top of the bushing or at the ports. A rapid drop in the pressure on the test pump gage should be thoroughly investigated in order to ascertain the cause. Worn or chipped port edges can be detected by a loss of pressure and visible seepage as the port approaches the opening position.

As a result of my invention, it will be seen that there is provided a new and novel device for testing injectors and the like which is so constructed and arranged that it can be adapted to test injectors not only of various manufacture but can be used for performing any of the various tests to which injectors are adapted to be subjected.

It will also be seen that my improved testing device consists of a number of parts which can be easily and inexpensively fabricated and quickly assembled. The parts of the device are so constructed and arranged that they can be conveniently encased and carried from one location to another so as to make the device portable.

While I have shown and described an embodiment which my invention may assume in practice, it will be understood that this embodiment is merely for the purpose of illustration and description, and that other forms may be devised within the scope of my invention as defined in the appended claims.

What I claim as my invention is:

1. In a device for testing injectors and the like, a pair of spaced-apart, substantially parallel post-like members, a yoke-like adjustable platform having a hole arranged in each end thereof through which said post-like members extend, a spacer sleeve arranged around each of said post-like members for supporting said platform, another yoke-shaped platform positioned above said first mentioned platform having a hole in each end thereof through which said post-like members extend, a shoulder arranged on each of said post-like members for supporting said last mentioned platform, a pair of threaded extension members with one attached to the upper ends of each of said post-like members, an elongated nut-like member for attaching the threaded extensions to the respective post-like members, an adjustable beam-like member extending between said extensions, an adjustable screw arranged centrally of said beam-like member, a nut-like member arranged on one of said threaded extensions, means for pivotally attaching one end of said beam-like member to said last mentioned nut-like member, another nut-like member arranged centrally of said beam-like member on the threaded portion of said screw, means for pivotally attaching said last mentioned nut-like member to said beam-like member, said beam-like member having an opening in the opposite end thereof through which the extension of the opposed post-like member extends, and a pair of nuts arranged on said last mentioned extension with one disposed to either side of said beam-like member.

2. In a device for testing injectors and the like, the combination as defined in claim 1, including a handwheel arranged on the upper end of said screw for turning the same, said handwheel having calibrations arranged on the upper surface thereof circumferentially therearound, and an adjustable member arranged on one of said extensions having calibrations arranged thereon which co-operate with the calibrations arranged on said handwheel so as to determine the amount of rotation of said screw.

3. In a device for testing injectors and the like, a pair of spaced-apart, substantially parallel post-like members, a yoke-like adjustable platform having a hole arranged in each end thereof through which said post-like members extend, a spacer sleeve arranged around each of said post-like members for supporting said platform, another yoke-like platform positioned above said first mentioned platform having a hole in each end thereof through which said post-like members extend, a shoulder arranged on each of said post-like members for supporting said last mentioned platform, means carried by said last mentioned platform for supporting the injector to be tested, means mounted on said first mentioned platform which is adapted to be connected to one end of the injector, a threaded extension arranged on the upper end of each of said post-like members with at least one of said extensions being removably attached to the outer end of its respective post-like member, a beam-like member extending between said extensions, means for adjustably connecting each end of said beam-like member to said extensions, including a nut-like member arranged on one of said threaded extensions to which one end of said beam-like member is pivotally attached, a pair of nuts arranged on the other threaded extension with one positioned to either side thereof, and an adjustable screw arranged centrally of said beam-like member between said extensions for co-operation with the opposite end of the injector to be tested.

4. In a device for testing injectors and the like, a pair of spaced-apart, substantially parallel post-like members, an adjustable yoke-like platform having a hole arranged to either side thereof through which said post-like members extend, said yoke-like platform having an aperture arranged therein centrally thereof, a spacer sleeve arranged around each of said post-like members for supporting said platform on said post-like members whereby various length sleeves can be utilized to adjust the height of said platform, another yoke-like platform positioned above said first mentioned platform, said last mentioned platform having a hole arranged to either side thereof through which said post-like members extend, a shoulder arranged on each of said post-like members adjacent the upper ends thereof for supporting said last mentioned platform at a spaced distance from said first mentioned platform, said last mentioned platform having an aperture arranged therein centrally thereof in which the injector or part to be tested is adapted to be positioned and through which it is adapted to extend, means for securely holding said last mentioned platform on the upper ends of said post-like members, means mounted on said first mentioned platform which is adapted to be connected to one end of the injector to be tested, an adjustable screw vertically arranged above said last mentioned platform and disposed substantially parallel to said post-like members and in axial alignment with the apertures in said platforms and which is adapted to co-operate with the opposite end of the injector, means for rotatably supporting said screw including an adjustable horizontally disposed beam-like member extending between the post-like members, means arranged at each end of said beam-like member for adjustably connecting the same to the respective post-like members, a handwheel arranged on the upper end of said screw for turning the same, said handwheel having calibrations arranged therearound, and a member arranged adjacent said handwheel having calibrations arranged vertically therealong which co-operate with the calibrations arranged on said handwheel so as to determine the amount of rotation of said screw.

5. In a device for testing injectors and the like, a pair of spaced-apart, substantially parallel post-like members, an adjustable yoke-like platform having a hole arranged to either side thereof through which said post-like members extend, said yoke-like platform having an aperture arranged therein centrally thereof, a spacer sleeve arranged around each of said post-like members for supporting said platform on said post-like members whereby various length sleeves can be utilized to adjust the height of said platform, another yoke-like platform positioned above said first mentioned platform, said last mentioned platform having a hole arranged to either side thereof through which said post-like members extend, a shoulder arranged on each of said post-like members adjacent the upper ends thereof for supporting said last mentioned platform at a spaced distance from said first mentioned platform, said last mentioned platform having an aperture arranged therein centrally thereof in which the injector or part to be tested is adapted to be positioned and through which it is adapted to extend, means for securely holding said last mentioned platform on the upper ends of said post-like members, means mounted on said first mentioned platform which is adapted to be connected to one end of the injector to be tested, an adjustable screw vertically arranged above said last mentioned platform and disposed substantially parallel to said post-like members in an axial alignment with the apertures in said platforms, and which is adapted to co-operate with the opposite end of the injector, means for rotatably supporting said screw, means for pivotally attaching said screw to said beam-like member centrally thereof, a handwheel arranged on the upper end of said screw for turning the same, said handwheel having calibrations arranged therearound, and a member arranged adjacent said handwheel having calibrations arranged vertically therealong which co-operate with the calibrations arranged on said handwheel so as to determine the amount of rotation of said screw.

6. In a device for testing injectors and the like, a pair of spaced-apart, substantially parallel post-like members, an adjustable yoke-like platform having a hole arranged to either side thereof through which said post-like members extend, said yoke-like platform having an aperture arranged therein centrally thereof, a spacer sleeve arranged around each of said post-like members for supporting said platform on said post-like members whereby various length sleeves can be utilized to adjust the height of said platform, another yoke-like platform positioned above said first mentioned platform, said last mentioned platform having a hole arranged to either side thereof through which said post-like members extend, a shoulder arranged on each of said post-like members adjacent the upper ends thereof for supporting said last mentioned platform at a spaced distance from said first mentioned platform, said last mentioned platform having an aperture arranged therein centrally thereof in which the injector or part to be tested is adapted to be positioned and through which it is adapted to extend, means for securely holding said last mentioned platform on the upper ends of said post-like members, means mounted on said first mentioned platform which is adapted to be connected to one end of the injector to be tested, an adjustable screw vertically arranged above said last mentioned platform and disposed substantially parallel to said post-like members and in axial alignment with the apertures in said platforms, and which is adapted to co-operate with the opposite end of the injector, means for rotatably supporting said screw including a pair of threaded extension members with one removably attached to the upper end of each of said post-like members, an elongated nut-like member for attaching the threaded extensions to each of the respective post-like members, an adjustable beam-like member extending between said extensions, a nut-like member arranged on one of said threaded extensions, means for pivotally attaching one end of said beam-like member to said last mentioned nut-like member, another nut-like member arranged centrally of said beam-like member on the threaded portion of said screw, means for pivotally attaching said last mentioned nut-like member to said beam-like member, said beam-like member having an opening in the opposite end thereof through which the extension of the other post-like member extends, a pair of nuts arranged on said last mentioned extension with one disposed to either side of said beam-like member, a handwheel arranged on the upper end of said screw for turning the same, said handwheel having calibrations arranged therearound, and a member arranged adjacent said handwheel having calibrations arranged vertically therealong which co-operate with the calibrations arranged on said handwheel so as to determine the amount of rotation of said screw.

References Cited in the file of this patent

UNITED STATES PATENTS

| | | |
|---|---|---|
| 277,898 | Harty | May 22, 1883 |
| 1,985,598 | Carver | Dec. 25, 1934 |
| 2,125,483 | Blanchard | Aug. 2, 1938 |
| 2,396,700 | Holcomb | Mar. 19, 1946 |
| 2,517,766 | Cole | Aug. 8, 1950 |
| 2,744,407 | Kruger et al. | May 8, 1956 |

FOREIGN PATENTS

| | | |
|---|---|---|
| 16,571 | Great Britain | Sept. 4, 1895 |
| 243,559 | Germany | Feb. 16, 1912 |